United States Patent [19]
Terrell et al.

[11] Patent Number: 5,950,800
[45] Date of Patent: Sep. 14, 1999

[54] CONVEYING METHODS AND APPARATUS

[75] Inventors: Jonathan Dean Terrell; Edward Ydoate, both of Louisville, Ky.

[73] Assignee: Sandvik Sorting Systems, Inc., Louisville, Ky.

[21] Appl. No.: 08/895,925

[22] Filed: Jul. 17, 1997

[51] Int. Cl.$^6$ .................................................. B65G 47/12
[52] U.S. Cl. ......................................... 198/448; 198/452
[58] Field of Search .................................. 198/443, 448, 198/452, 453, 460.1, 461.2

[56] References Cited

U.S. PATENT DOCUMENTS

| | | | |
|---|---|---|---|
| 5,222,586 | 6/1993 | Ydoate et al. | 198/452 |
| 5,423,431 | 6/1995 | Westin | 198/443 X |
| 5,460,271 | 10/1995 | Kenny et al. | 198/461.1 X |
| 5,701,989 | 12/1997 | Boone et al. | 198/448 |
| 5,738,202 | 4/1998 | Ydoate et al. | 198/460.1 |

*Primary Examiner*—James R. Bidwell
*Attorney, Agent, or Firm*—Burns, Doane, Swecker & Mathis, L.L.P.

[57] ABSTRACT

Articles are conveyed along a singulator conveyor system by being conveyed upwardly along an inclined first conveyor which is inclined at an angle of at least twenty-five degrees, so that any articles disposed atop other articles will fall off. The articles are discharged onto a second conveyor travelling horizontally at a linear speed at least twice that of the first conveyor in a direction substantially perpendicularly to a direction of travel of the first conveyor. The articles are then discharged from the second conveyor onto a third conveyor travelling generally horizontally at a linear speed at least twice that of the second conveyor in a direction substantially perpendicularly to the second conveyor. The articles are discharged from the third conveyor onto a slide which guides the articles downwardly onto a fourth conveyor which travels in the same direction as the third conveyor at the same speed as the third conveyor. The slide is transversely inclined toward an inner longitudinal edge of the fourth conveyor to guide articles downwardly toward that edge and into engagement with a vertical guide wall extending along that edge.

15 Claims, 2 Drawing Sheets

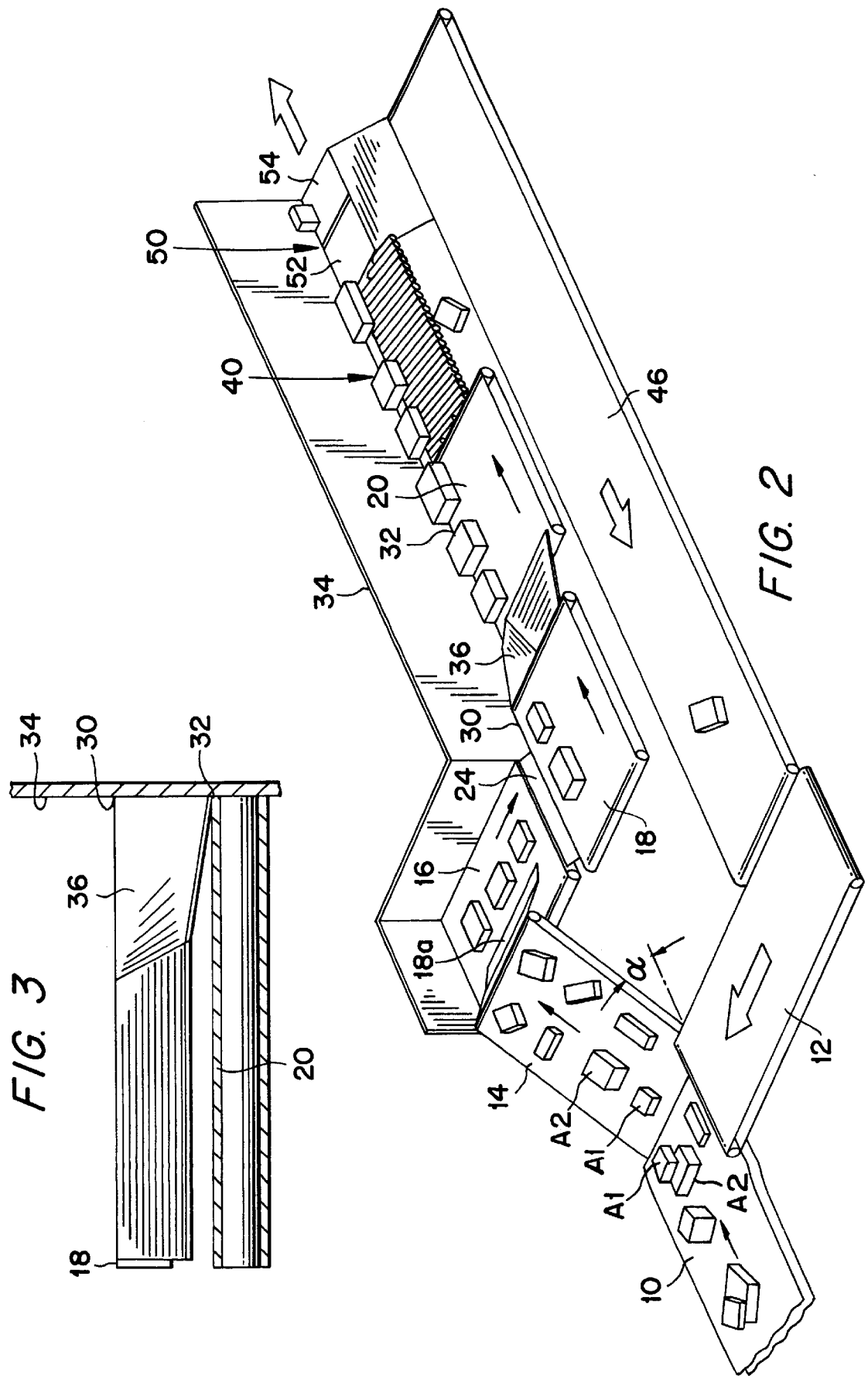

CONVEYING METHODS AND APPARATUS

BACKGROUND OF THE INVENTION

The present invention relates to the conveying of randomly supplied articles, especially in a manner producing a destacking, separation, and alignment of the articles.

Articles conveyed in bulk, such as mail in the form of differently sized packages (e.g., boxes, flats and softpacks) are generally randomly oriented and possibly stacked one upon the other (i.e., a three-dimensional arrangement). It is desirable to transform the packages from such a bulk state to a state more acceptable for handling, such as a de-stacked, single file, aligned state. Frequently, this is performed manually which, of course, is very labor intensive.

An object of the present invention is to perform that function automatically.

SUMMARY OF THE INVENTION

The present invention relates to a conveying system comprising a driven inclined first conveyor, a driven generally horizontal second conveyor, and a driven generally horizontal third conveyor. The first conveyor is oriented to convey articles upwardly at an angle of inclination of at least 25 degrees relative to horizontal. The second conveyor is arranged adjacent and below an upper end of the first conveyor for receiving articles from the first conveyor. The second conveyor travels substantially perpendicularly to a direction of travel of the first conveyor as viewed in plan. The second conveyor travels at a linear speed at least twice that of the first conveyor. The third conveyor is disposed at a downstream end of the second conveyor at a lower elevation than the second conveyor for receiving articles therefrom. The third conveyor travels substantially perpendicularly relative to the direction of travel of the second conveyor. The third conveyor travels at a linear speed at least twice that of the second conveyor.

Preferably there is a fourth conveyor arranged substantially horizontally and oriented to convey articles in substantially the same direction as the third conveyor. The fourth conveyor includes an upstream end disposed adjacent to, and at a lower elevation than, a downstream end of the third conveyor. The fourth conveyor travels at substantially the same linear speed as the third conveyor.

Preferably, a vertical guide wall extends along a longitudinal edge of the fourth conveyor. A stationary slide extends longitudinally downwardly from the third conveyor to the fourth conveyor. The slide also extends transversely downwardly toward the vertical wall to guide articles toward and against the vertical wall.

The present invention also relates to a method of conveying articles, comprising the steps of:

A) conveying articles upwardly on a driven inclined first conveyor at an angle of at least 25 degrees, so that any articles disposed atop other articles will fall off;

B) discharging the articles from an upper end of the first conveyor downwardly onto a second conveyor traveling generally horizontally at a linear speed at least twice that of the first conveyor in a direction substantially perpendicularly to a direction of travel of the first conveyor, as viewed in plan, whereby the articles tend to become aligned in single file on the second conveyor; and C) discharging the articles from a downstream end of the second conveyor downwardly onto an upstream end of a third conveyor traveling generally horizontally at a linear speed at least twice that of the second conveyor in a direction substantially perpendicular to the direction of travel of the second conveyor as viewed in plan.

Preferably there is a further step of discharging the articles from a downstream end of the second conveyor downwardly onto an upstream end of a third conveyor travelling generally longitudinally at substantially the same linear speed as the third conveyor in substantially the same direction as the third conveyor.

Preferably the method includes the further step of guiding articles from the third conveyor to the fourth conveyor along a slide which is longitudinally and transversely inclined to guide articles toward a vertical wall extending along one longitudinal edge of the fourth conveyor.

Another aspect of the invention involves a method of conveying articles comprising the steps of:

A) introducing articles onto an upstream conveyor traveling in a generally horizontal direction, the articles being introduced adjacent an inner longitudinal edge of the upstream conveyor in a direction substantially perpendicular to the direction of travel of the upstream conveyor, as viewed in plan;

B) driving the upstream conveyor at a linear speed at least twice that of the speed of articles introduced onto the upstream conveyor;

C) discharging the articles onto a slide extending downwardly from a downstream end of the upstream conveyor to an upstream end of a downstream conveyor, the slide being transversely inclined toward an inner longitudinal edge of the downstream conveyor;

D) guiding the articles along the slide and into contact with a vertical wall extending along the inner longitudinal edge of the downstream conveyor; and E) driving the downstream conveyor at substantially the same linear speed as the upstream conveyor.

BRIEF DESCRIPTION OF THE DRAWING

The objects and advantages of the invention will become apparent from the following detailed description of a preferred embodiment thereof in connection with the accompanying drawing in which like numerals designate like elements and in which:

FIG. 2 is a top perspective view of the conveying system depicted FIG. 1; and

FIG. 3 is a vertical sectional view taken along the line 3—3 in FIG. 1.

DETAILED DESCRIPTION OF A PREFERRED EMBODIMENT OF THE INVENTION

Figure 1:
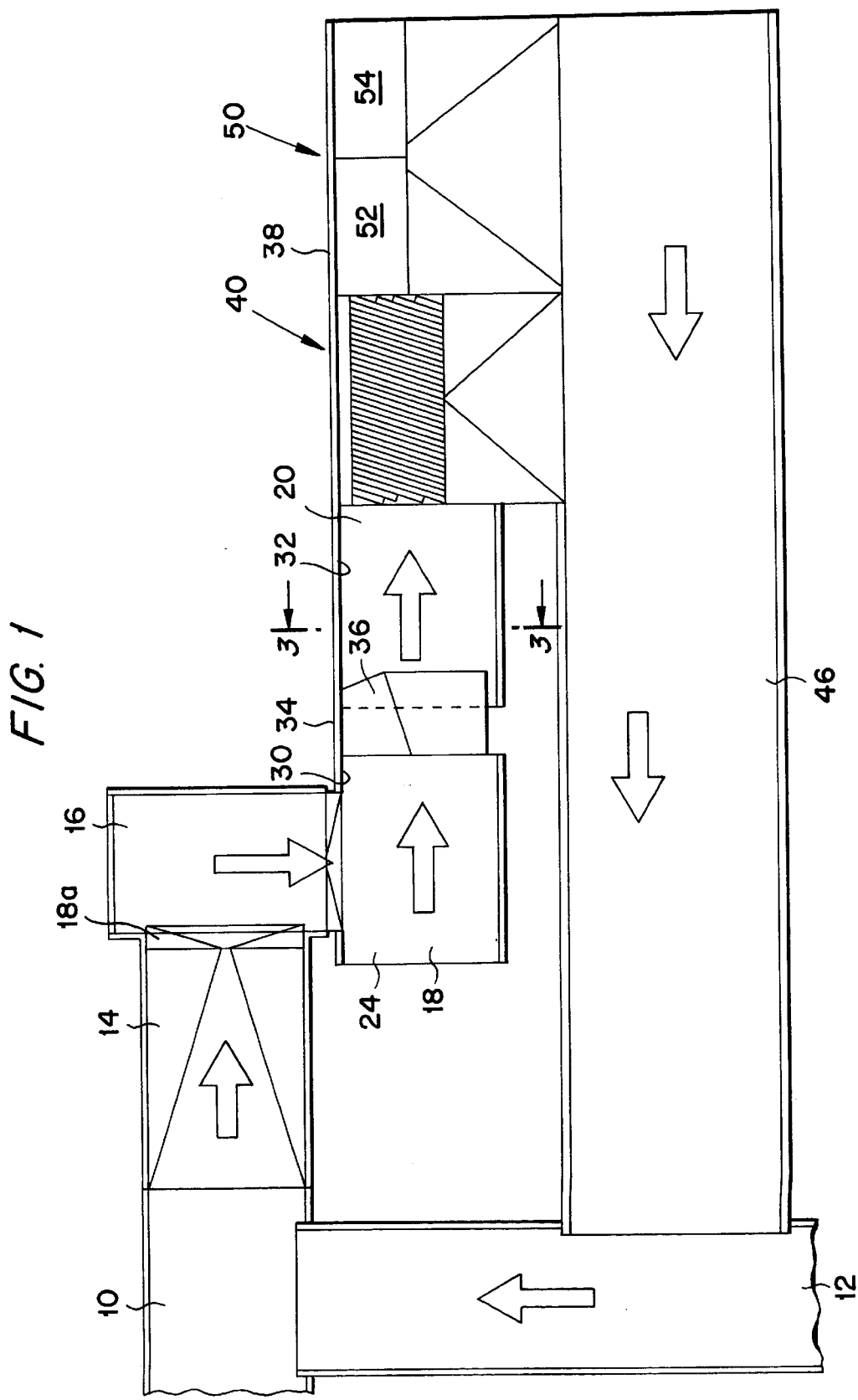
FIG. 1 is a schematic top plan view of a conveying system according to the present invention.

Depicted in FIGS. 1 and 2 is a singulator conveying system for handling articles received in a bulk flow, such as mail of different sizes and shapes, and possibly stacked upon one another. The articles are delivered to the system from an infeed conveyor 10 which can also be supplied from a recirculation conveyor 12. The system includes first, second, third, and fourth conveyors 14, 16, 18, 20, preferably in the form of driven endless belts, although driven rollers could be employed instead. The belts are driven by suitable conventional motors (not shown).

The discharge end of each of those conveyors is higher than the inlet end of the next conveyor, and the linear speeds of the conveyors become progressively faster from each conveyor to the next, as will be explained.

The first conveyor 14 has a high-friction conveying surface and is inclined upwardly at an angle of inclination of at least 25 degrees relative to horizontal, preferably about 30 degrees. Articles deposited onto the first conveyor 14 in a stacked state (i.e., one upon the other) will be destacked as they travel along the first conveyor 14. That is, the upper article(s) A1 will fall off the lower article A2 in the stack, whereby the article grouping is transformed from a three-dimensional state (shown at the discharge end of the infeed conveyor 10 in FIG. 2) to a two-dimensional state (shown on the belt 14 in FIG. 2).

At the upper end of the first conveyor 14 the articles are discharged onto the second conveyor which is traveling in a generally horizontal direction perpendicular to that of the first conveyor, as viewed in plan, at a linear speed at least twice that of the first conveyor. Thus, as articles fall onto the second conveyor 16, they are quickly displaced. That is, each row of articles received from the first conveyor 14 is "stripped away" before the next row is discharged. Hence, the articles tend to assume a single file relationship on the second conveyor.

Preferably a downwardly inclined stationary slide 18a extends from the first conveyor 14 to the second conveyor 16 for guiding the articles.

The downstream end of the second conveyor 16 is disposed above an inner longitudinal edge 30 of the third conveyor 18. The third conveyor is traveling in a horizontal direction perpendicular to the direction of travel of the second conveyor 16, as viewed in plan. The linear speed of the third conveyor 18 is at least twice that of the second conveyor, so the aligned/single-file relationship of the articles achieved during transfer from the first to the second conveyors is improved as the articles travel from the second conveyor to the third conveyor.

Preferably, a stationary slide 24 extends downwardly from the second conveyor 16 to the third conveyor 18 to guide the articles.

The fourth conveyor 20 travels in the same horizontal direction as the third conveyor although at a lower elevation. The linear speed of the fourth conveyor is the same as that of the third conveyor.

Inner longitudinal edges 30, 32 of the third and fourth conveyors are aligned with one another, and a vertical guide wall 34 extends along those edges. A stationary slide 36 extends from the third to the fourth conveyor. An inner portion of that slide disposed adjacent the wall 34 is inclined not only longitudinally downwardly, but also transversely downward toward the wall 34. Therefore, the articles will be guided into engagement with the wall 34 as they travel downwardly along the slide 36.

This will result in the articles being properly positioned for travel through a side-by-side eliminator 40 of the type disclosed in U.S. Ser. No. 08/654,193, filed May 28, 1996, now U.S. Pat. No. 5,701,989, the disclosure of which is incorporated herein by reference. Such an eliminator ensures that articles are discharged therefrom in only a single file relationship. In the case of articles entering the eliminator in a side-by-side relationship, the outside articles (i.e., the ones located remotely of the wall 38, will slide down onto a recirculation conveyor 46 and be returned to the infeed conveyor 10.

A flow control conveyor section 50 is disposed downstream of the eliminator 40. The flow control section 50 can be of the type disclosed in U.S. Ser. No. 08/576,475, filed Dec. 21, 1995, now U.S. Pat. No. 5,738,202, the disclosure of which is incorporated herein by reference. The flow control conveyor includes first and second conveyors 52, 54. The second conveyor 54 travels faster than the first conveyor 52 to regulate the spacing between the articles. Any articles falling off the flow control conveyor section 50 will be conveyed to the infeed conveyor 10 by the recirculation conveyor 46.

It will be appreciated that the conveying system serves to destack and align bulk articles into a single-file relationship, thereby facilitating further handling thereof.

One example of relative linear speeds of the conveyors is as follows: conveyor 14 at 55 fpm; conveyor 16 at 120 fpm; conveyor 18 at 270 fpm; and conveyor 20 at 270 fpm. The difference in elevation between the discharge end of the first conveyor 14 and the second conveyor 16 can be 12 inches; between the discharge end of the second conveyor 16 and the third conveyor 18 can be 4 inches; between the third and fourth conveyors 18, 20 can be 8 inches.

The second, third, and fourth conveyors 16, 18 and 20 preferably have relatively low-friction conveying surfaces to facilitate the entry of articles from the slides 18, 24 and 36.

Although the present invention has been described in connection with a preferred embodiment thereof, it will be appreciated by those skilled in the art that additions, deletions, modifications, and substitutions not specifically described may be made without departing from the spirit and scope of the invention as defined in the appended claims.

What is claimed is:

1. A conveying system comprising:
   a driven inclined first conveyor oriented to convey articles upwardly at any angle of inclination of at least 25 degrees relative to horizontal;
   a driven generally horizontal second conveyor arranged adjacent and below an upper end of the first conveyor for receiving articles from the first conveyor, the second conveyor traveling substantially perpendicularly to a direction of travel of the first conveyor as viewed in plan, the second conveyor traveling at a linear speed at least twice that of the first conveyor; and
   a driven generally horizontal third conveyor disposed at a downstream end of the second conveyor at a lower elevation than the second conveyor for receiving articles therefrom, the third conveyor traveling substantially perpendicularly relative to the direction of travel of the second conveyor, the third conveyor traveling at a linear speed at least twice that of the second conveyor.

2. The conveying system according to claim 1 further including a fourth conveyor arranged substantially horizontally and oriented to convey articles in substantially the same direction as the third conveyor; the fourth conveyor including an upstream end disposed adjacent to, and at a lower elevation than, a downstream end of the third conveyor, the fourth conveyor traveling at substantially the same linear speed as the third conveyor.

3. The conveying system according to claim 2, further including a vertical guide wall extending along a longitudinal edge of the fourth conveyor, a stationary slide extending longitudinally downwardly from the third conveyor to the fourth conveyor, and transversely downwardly toward the vertical wall to guide articles toward and against the vertical wall.

4. The conveying system according to claim 1 wherein a conveying surface of the first conveyor has a higher coefficient of friction than a conveying surface of the second conveyor.

5. The conveying system according to claim 2 wherein the first, second, third, and fourth conveyors comprise endless belt conveyors.

6. The conveying system according to claim 1 wherein the angle of inclination of the first conveyor is about 30 degrees.

7. The conveying system according to claim 1, further including a downwardly inclined stationary first slide positioned for guiding articles traveling from the first conveyor to the second conveyor.

8. The conveying system according to claim 7, further including a downwardly inclined stationary second slide positioned for guiding articles traveling from the second conveyor to the third conveyor.

9. A method of conveying articles comprising the steps of:
   A) conveying articles upwardly on a driven inclined first conveyor at an angle of at least 25 degrees, so that any articles disposed atop other articles will fall off;
   B) discharging the articles from an upper end of the first conveyor downwardly onto a second conveyor traveling generally horizontally at a linear speed at least twice that of the first conveyor in a direction substantially perpendicularly to a direction of travel of the first conveyor, as viewed in plan, whereby the articles tend to become aligned in single file on the second conveyor; and
   C) discharging the articles from a downstream end of the second conveyor downwardly onto an upstream end of a third conveyor traveling generally horizontally at a linear speed at least twice that of the second conveyor in a direction substantially perpendicular to the direction of travel of the second conveyor as viewed in plan.

10. The method according to claim 9 further including a step D of discharging the articles from a downstream end of the second conveyor downwardly onto an upstream end of a third conveyor traveling generally horizontally at substantially the same linear speed as the third conveyor in substantially the same direction as the third conveyor.

11. The method according to claim 10, wherein step D comprises guiding articles from the third conveyor to the fourth conveyor along a slide which is longitudinally and transversely inclined to guide articles toward a vertical wall extending along one longitudinal edge of the fourth conveyor.

12. The method according to claim 9 wherein step A comprises conveying articles on the first conveyor which has a conveying surface with a higher coefficient of friction than the second conveyor.

13. The method according to claim 9 wherein step B comprises guiding articles along a downwardly inclined stationary first slide from the first conveyor to the second conveyor.

14. The method according to claim 12 wherein step C comprises guiding articles along a downwardly inclined stationary second slide from the second conveyor to the third conveyor.

15. A method of conveying articles comprising the steps of:
   A) introducing articles onto an upstream conveyor traveling in a generally horizontal direction, the articles being introduced adjacent an inner longitudinal edge of the upstream conveyor in a direction substantially perpendicular to the direction of travel of the upstream conveyor, as viewed in plan;
   B) driving the upstream conveyor at a linear speed at least twice that of the speed of articles introduced onto the upstream conveyor;
   C) discharging the articles onto a slide extending downwardly from a downstream end of the upstream conveyor to an upstream end of a downstream conveyor, the slide being transversely inclined toward an inner longitudinal edge of the downstream conveyor;
   D) guiding the articles along the slide and into contact with a vertical wall extending along the inner longitudinal edge of the downstream conveyor; and
   E) driving the downstream conveyor at substantially the same linear speed as the upstream conveyor.

* * * * *